US010681325B2

United States Patent
Kontkanen et al.

(10) Patent No.: US 10,681,325 B2
(45) Date of Patent: Jun. 9, 2020

(54) CONTINUOUS DEPTH-ORDERED IMAGE COMPOSITING

(71) Applicant: Google Inc., Mountain View, CA (US)

(72) Inventors: Janne Kontkanen, San Francisco, CA (US); Noah Snavely, Menlo Park, CA (US)

(73) Assignee: Google LLC, Mountain View, CA (US)

( * ) Notice: Subject to any disclaimer, the term of this patent is extended or adjusted under 35 U.S.C. 154(b) by 280 days.

(21) Appl. No.: 15/156,192

(22) Filed: May 16, 2016

(65) Prior Publication Data
US 2017/0332063 A1 Nov. 16, 2017

(51) Int. Cl.
| H04N 13/106 | (2018.01) |
| H04N 13/204 | (2018.01) |
| H04N 13/257 | (2018.01) |
| G06T 15/40 | (2011.01) |
| G06T 15/20 | (2011.01) |
| G06T 15/50 | (2011.01) |

(52) U.S. Cl.
CPC ......... *H04N 13/106* (2018.05); *G06T 15/205* (2013.01); *G06T 15/40* (2013.01); *G06T 15/503* (2013.01); *H04N 13/204* (2018.05); *H04N 13/257* (2018.05)

(58) Field of Classification Search
CPC .................................................. H04N 13/0007
See application file for complete search history.

(56) References Cited

U.S. PATENT DOCUMENTS

| 8,723,789 | B1* | 5/2014 | Rafii | G06F 3/017 345/156 |
| 9,800,852 | B1* | 10/2017 | Kolb | H04N 9/646 |
| 2004/0119716 | A1* | 6/2004 | Park | G06T 7/579 345/473 |
| 2008/0158345 | A1* | 7/2008 | Schklair | G06T 17/20 348/47 |
| 2010/0111417 | A1* | 5/2010 | Ward | H04N 13/026 382/173 |
| 2013/0127895 | A1* | 5/2013 | Miller | G06T 15/40 345/589 |

(Continued)

FOREIGN PATENT DOCUMENTS

EP 0775982 A2 5/1997

OTHER PUBLICATIONS

NPL: "2D to 3D conversion of sports content using panoramas"; Schnyder; 2011.*

(Continued)

*Primary Examiner* — William C Vaughn, Jr.
*Assistant Examiner* — Joseph Daniel A Towe
(74) *Attorney, Agent, or Firm* — Lowenstein Sandler LLP (57) ABSTRACT

A system creates an output image of a scene using two-dimensional (2D) images of the scene. For a pixel in the output image, the system identifies, in the output image, 2D fragments that correspond to the pixel. The system converts the 2D fragments into three dimensional (3D) fragments, creates volume spans for the pixel based on the 3D fragments, determines a color of a volume span based on color contribution of respective one or more of the 3D fragments for the volume span, and determines a color of the pixel for the output image from determined colors of the volume spans.

14 Claims, 7 Drawing Sheets

(56) References Cited

U.S. PATENT DOCUMENTS

2016/0050368 A1* 2/2016 Seo .................... G06T 7/11
348/36
2017/0126968 A1* 5/2017 Somanath ............ H04N 13/207

OTHER PUBLICATIONS

NPL: "Automatic panoramic image stitching using invariant features"; Brown; 2007.*
NPL: "Virtual view generation of 3D digital video"; Moezzi; 1997.*
Schnyder et al., "2D to 3D Conversion of Sports Content Using Panoramas", 4 pages, 2011, 18th IEEE International Conference on Image Processing. (Year: 2011).*
Arikan et al., "Large-Scale Point-Cloud Visualization through Localized Textured Surface Reconstruction", 13 pages, 2014, IEEE Transactions on Visualization and Computer Graphics, vol. 20, No. 9, Sep. 2014. (Year: 2014).*
Porter, Thomas, and Tom Duff. "Compositing digital images." In ACM Siggraph Computer Graphics, vol. 18, No. 3, pp. 253-259. ACM, 1984. 7 pages.
Carpenter, Loren. "The A-buffer, an Antialiased Hidden Surface Method." ACM Siggraph Computer Graphics 18, No. 3 (1984): 103-108. 6 pages.
Zwicker, Matthias, Hanspeter Pfister, Jeroen Van Baar, and Markus Gross. "Surface Splatting." In Proceedings of the 28th Annual Conference on Computer Graphics and Interactive Techniques, pp. 371-378. ACM, 2001. 8 pages.
McGuire, Morgan, and Louis Bavoil. "Weighted Blended Order-Independent Transparency." Journal of Computer Graphics Techniques (JCGT) 2, No. 2 (2013). 20 pages.
Gortler, S.J et al., "Rendering Layered Depth Images", Technical Report MSTR-TR-97-00, Mar. 19, 1997. 12 pages.
PCT Search Report RE: Application #PCT/US2016/069168 dated May 11, 2017, 5 pages.
International Preliminary Report on Patentability for PCT/US2016/069168 dated Aug. 13, 2018, 7 pages.

* cited by examiner

CONTINUOUS DEPTH-ORDERED IMAGE COMPOSITING

TECHNICAL FIELD

Aspects and implementations of the present disclosure relate to image compositing, and more specifically, to continuous depth-ordered image compositing.

BACKGROUND

Three dimensional (3D) rendering is the computer graphics process of automatically converting 3D wire frame models into two dimensional (2D) images with 3D photorealistic effects or non-photorealistic rendering on a computer. A wire frame model is a visual presentation of a 3D or physical object used in 3D computer graphics. A scene description language can be used to describe a scene that is to be rendered by a 3D renderer into a 2D image. In the process of rendering a 2D image of a scene out of a 3D scene description, each pixel for the 2D image may receive contributions (e.g., image fragments) from multiple objects in the scene. In order to produce a single color value for each pixel, these image fragments are generally combined together in a process that is usually referred to as "compositing". To correctly account for occlusion (e.g., hidden objects), foreground fragments should generally fully occlude the background fragments. If the foreground fragments are semi-transparent, the foreground fragments should be composited on top of the background fragments using a physically-based blending technique, such as an "over" operation. Depending on which order the fragments are composited in, a different result for the pixel color may be obtained. The 3D scene description can be inaccurate, and as the scene is animated, small errors in the surface positions may cause the fragment order to change abruptly. Such sudden changes may cause large discontinuous changes in the final color of the composited pixel, showing up as sptial aliasing in a 3D image or flickering in a video.

SUMMARY

The following presents a simplified summary of various aspects of this disclosure in order to provide a basic understanding of such aspects. This summary is not an extensive overview of all contemplated aspects, and is intended to neither identify key or critical elements nor delineate the scope of such aspects. Its purpose is to present some concepts of this disclosure in a simplified form as a prelude to the more detailed description that is presented later.

In an aspect of the present disclosure, a processing device creates an output image of a scene using two-dimensional (2D) images of the scene. For a pixel in the output image, the processing device identifies, in the output image, 2D fragments corresponding to the pixel, converts the 2D fragments into three dimensional (3D) fragments, creates volume spans for the pixel based on the 3D fragments, determines a color of a volume span based on color contribution of respective one or more of the 3D fragments for the volume span, and determines a color of the pixel for the output image from determined colors of the volume spans. In one implementation, the 2D images are captured by multiple cameras. In one implementation, the converting of the 2D fragments into the 3D fragments comprises adding a pre-defined thickness to individual 2D fragments.

In one implementation, the pre-defined thickness is defined in a disparity space. In one implementation, the determining of the color of the volume span comprises identifying the one or more of the 3D fragments that contribute color to the volume span, and determining the color contribution of the identified 3D fragments. In one implementation, the determining of the color contribution comprises determining a length of the volume span, determining a total thickness of individual 3D fragments of the identified one or more 3D fragments, and dividing the length of the volume span by the total thickness. In one implementation, the creating of the volume spans for the pixel based on the 3D fragments comprises marking start events and end events for the 3D fragments, ordering the start events and end events sequentially, and defining start events and end events for the volume spans for the pixel based on a sequential ordering of the start events and end events for the 3D fragments.

An apparatus comprising means for creating an output image of a scene using 2D images of the scene. For a pixel in the output image, means for identifying, in the output image, 2D fragments corresponding to the pixel, means for converting the 2D fragments into 3D fragments, means for creating volume spans for the pixel based on the 3D fragments, means for determining a color of a volume span of the volume spans based on color contribution of respective one or more of the 3D fragments for the volume span, and means for determining a color of the pixel for the output image from determined colors of the volume spans. In one implementation, the 2D images are captured by multiple cameras. In one implementation, the means for converting the 2D fragments into the 3D fragments comprises means for adding a pre-defined thickness to individual 2D fragments.

In one implementation, the pre-defined thickness is defined in a disparity space. In one implementation, the means for determining the color of the volume span comprises means for identifying the one or more of the 3D fragments that contribute color to the volume span, and means for determining the color contribution of the identified 3D fragments. In one implementation, the means for determining of the color contribution comprises means for determining a length of the volume span, means for determining a total thickness of individual 3D fragments of the identified one or more 3D fragments, and means for dividing the length of the volume span by the total thickness. In one implementation, the means for creating of the volume spans for the pixel based on the 3D fragments comprises means for marking start events and end events for the 3D fragments, means for ordering the start events and end event for the 3D fragments sequentially, and means for defining start events and end events for the volume spans for the pixel based on a sequential ordering of the start events and end events for the 3D fragments.

In additional implementations, computing devices for performing the operations of the above described implementations are also implemented. Additionally, in implementations of the disclosure, a computer readable storage media may store instructions for performing the operations of the implementations described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Aspects and implementations of the present disclosure are directed to continuous depth-ordered image compositing. Cameras can capture a sequence of images for a video. A video frame is one of the many still images which compose a moving picture (hereinafter referred to as "video"). Video flicker refers to a result from large discontinuous changes in the colors of pixels in the images. In the process of rendering a two dimensional (2D) image of a scene out of a three dimensional (3D) scene description, each pixel for the 2D image may receive contributions (e.g., image fragments) from multiple objects in the scene. In order to produce a single color value for each pixel, these image fragments are generally combined together in a process that is usually referred to as "compositing". Generally, compositing involves compositing fragments in an order. Depending on which order the fragments are composited in, a different result for the pixel color may be obtained. Conventional compositing techniques may inaccurately cluster fragments together, and as the scene is animated, the clustered fragments may cause the fragment order to change abruptly. Such sudden changes may cause large discontinuous changes in the final color of the composited pixel, and produce spatially inconsistent results in the 2D images and temporally inconsistent results in videos. Aspects of the present disclosure can remove and/or prevent sudden changes in a fragment order to provide spatially and temporally continuous image compositing. Continuous and/or continuity hereinafter refers to an infinitesimal change in depth should produce only an infinitesimal change in the composited result.

Aspects of the present disclosure collect fragments for each pixel during the rendering of a 2D output image. Unlike conventional compositing solutions, aspects of the present disclosure assign a finite thickness to each fragment to convert the fragments into 3D fragments. Aspects of the present disclosure use the finite thicknesses of the 3D fragments to determine how to group fragments together. The grouping of the fragments based on the finite thicknesses of the 3D fragments prevents sudden changes in a fragment order. Aspects of the present disclosure can determine a color of a pixel based on the color contribution of the fragment grouping. Aspects of the present disclosure produce more accurate pixel colors to provide spatially and temporally continuous image compositing, which helps prevent video flickering.

Figure 1:
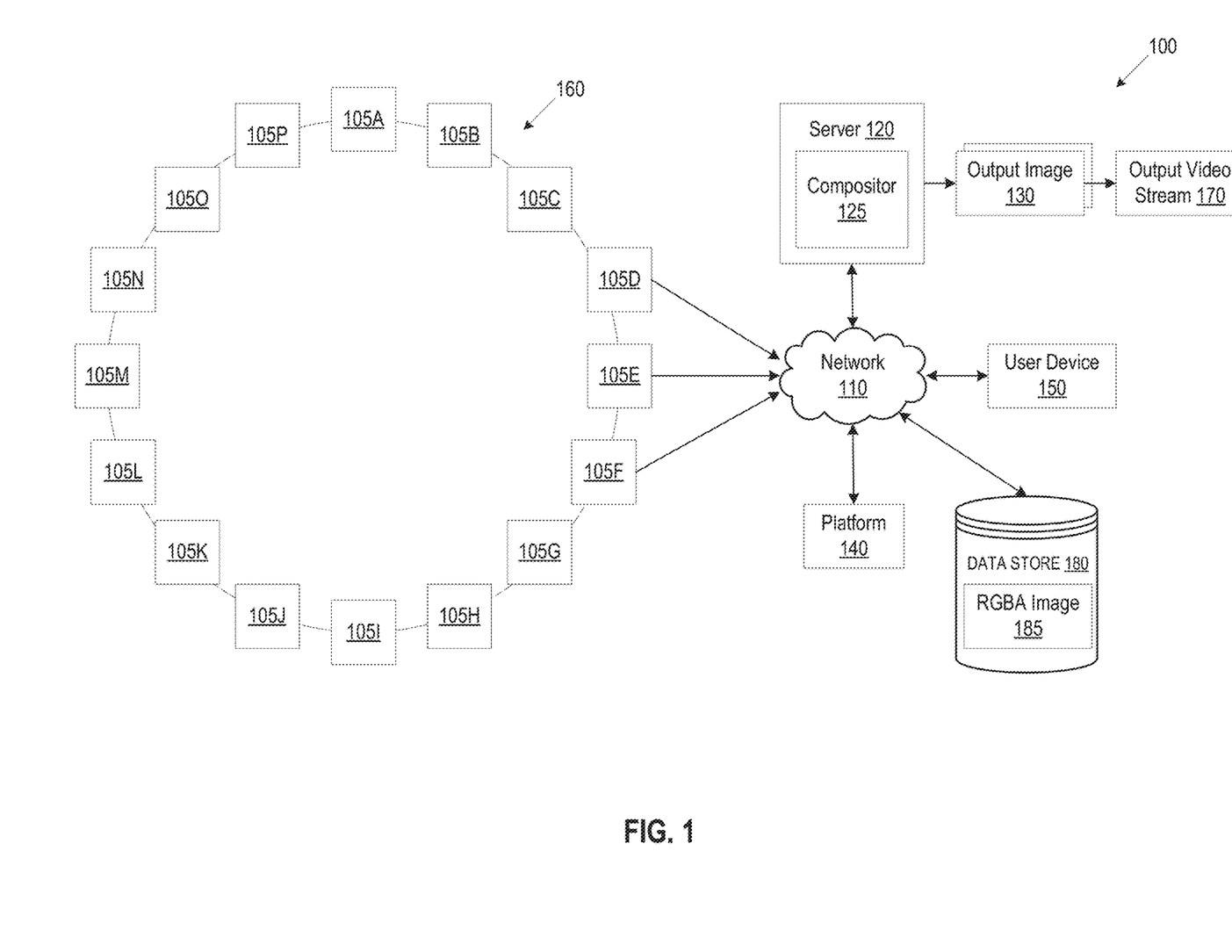
FIG. 1 depicts an example of system architecture for continuous image compositing, in accordance with one implementation of the present disclosure.

FIG. 1 illustrates an example of system architecture 100 for continuous image compositing, which helps prevent undesired artifacts in 2D images and temporal flickering in videos, in accordance with one implementation of the disclosure. The system architecture 100 includes one or more cameras (e.g., cameras 105A-105P), one or more servers (e.g., server 120), one or more data stores (e.g., data store 106), one or more user devices (e.g., user device 150) and one or more platforms (e.g., platform 140), coupled via one or more networks (e.g., network 110).

In one implementation, network 110 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the network 110 may be a cloud.

The cameras 105A-105P can be, for example, ODS (omni-directional stereo) cameras and/or depth aware cameras. An ODS camera is a camera with a 360-degree field of view in the horizontal plane, or with a visual field that covers (approximately) the entire sphere. A depth aware camera can create depth data for one or more objects that are captured in range of the depth aware camera. In one implementation, system architecture 100 includes one depth-aware camera. In another implementation, system architecture 100 includes multiple cameras, such as ODS cameras and/or depth-aware cameras.

The cameras can be setup in a camera array 160. The cameras in the camera array 160 can share settings and frame-level synchronization to have the cameras act as one camera. For example, system architecture 100 may include 16 ODS cameras setup in a camera array 160. The camera array 160 can be circular. The circular array 160 can include a stereoscopic virtual reality (VR) rig to house the cameras. The camera array 160 can be a multi-viewpoint camera system, which can link the motion of the cameras together to capture images of a scene from different angles. A scene can include one or more objects.

A camera can use a RGB (Red, Green, Blue) color space. In one implementation, a camera can produce output data, such as color data. The color data can include a RGB vector for each pixel in an image captured by the camera. In another implementation, a camera can produce output data that can be converted into color data (e.g., RGB vector). A camera using a RGB color space is used as an example throughout this document.

The cameras 105A-P can capture a scene that is in range of the cameras 105A-P to create content, for example, for a video stream. The content can be a sequence of RGB images of the scene. Each of the cameras 105A-P can output a video stream, which is composed of a sequence of RGB images captured by a respective camera. The RGB images in a video stream are made of pixels. The RGB images can be encoded, for example, as binary char arrays, with 4 bytes per pixel.

The video streams and color data can be stored in a data store (e.g., data store 180). The data store 180 can be a persistent storage that is capable of storing data. A persistent storage can be a local storage unit or a remote storage unit.

Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

One or more servers (e.g., server 120) can process the video streams, which are generated by the cameras 105A-P to produce output images (e.g., output image 130) to generate an output video stream 170. The servers can be hosted by one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide content to users.

In one implementation, the output images are of a panorama scene (or "panorama"), and the output video stream can be an immersive video. In other implementations, the output images are of non-panoramic views. A panorama is a wide-angle view or representation of a physical space. Immersive videos, also known as "360 videos", "360 degree videos", or "spherical videos", are video streams of a real-world panorama, where the view in every direction is recorded at the same time, and shot using, for example, omni-directional stereo cameras (e.g., cameras 105A-105P), or a collection of cameras (e.g., camera array 160). During playback, a user can control the viewing direction, which is a form of virtual reality. Virtual reality (VR) is a computer technology that replicates an environment, real or imagined, and can simulate a user's physical presence and environment in a way that allows the user to interact with it. Virtual realities can artificially create sensory experience, which can include sight, touch, hearing, and/or smell.

The server 120 can use computer vision, and 3D alignment for aligning the RGB images produced by the cameras 105A-P and stitching the RGB images into a seamless photo-mosaic to create the output video stream 170. Computer vision refers to methods for acquiring, processing, analyzing, and understanding images and high-dimensional data from the real world in order to produce numerical or symbolic information. The output images (e.g., output image 130) and the output video stream 170 can be stored in the data store 180.

The server 120 can include a compositor 125 to determine colors of pixels for the output images (e.g., output image 130) for the output video stream 170. The compositor 125 can apply a splatting technique to the input images produced by the cameras 105A-P to produce splats for the output images (e.g., output image 130) to produce a RGBA vector that includes four channels (e.g., Red channel, Green channel, Blue channel, Alpha channel) for each pixel. "Alpha" is hereinafter also represented by "α." Opacity information is represented by the alpha channel (Alpha). Opacity is the condition of lacking transparency or translucence (opaqueness). The combination of RGB images produced by the cameras 105A-P, along with the alpha channel information for the pixel, is hereinafter referred to as RGBA images. The RGBA images can be 2D images. The output images (e.g., output image 130), which are generated from the RGBA images 185, can be 2D images. The compositor 125 can analyze the scenes in the 2D RGBA images 185 in 3D. The server 120 can adapt the stitching based on the analysis of the compositor 125.

To analyze the scenes in the 2D RGBA images 185 in 3D modeling, the compositor 125 can identify a pixel in the output image 130, and identify 2D fragments in the output image 130 that are associated with the pixel. The compositor 125 can convert the 2D fragments into 3D fragments for the pixel, and create volume spans for the pixel based on the 3D fragments. The compositor 125 can determine the colors of the volume spans based on the color contribution of the 3D fragments and determine a color of the pixel for the output image based on the colors of the volume spans. The analyzing of the scenes in the 2D RGBA images 185 in 3D modeling to determine more accurate colors of the pixels is described in greater detail below in conjunction with FIGS. 2-5. The compositor 125 can determine the color of each pixel in an output image 130. The compositor 125 can determine the colors of the pixels in the output images that are used to generate the output video stream 170.

The output video stream 170 can be a single video stream that can be accessed by one or more platforms (e.g., content sharing platform). The one or more platforms can provide the output video stream 170 to one or more user devices (e.g., VR headset, smart phone, etc.). For example, the output video stream 170 can be played back in a VR headset or any type of system supporting 360 views. The providing of the output video stream 170 by one or more platforms to one or more user devices is described in greater detail below in FIG. 6.

Figure 2:
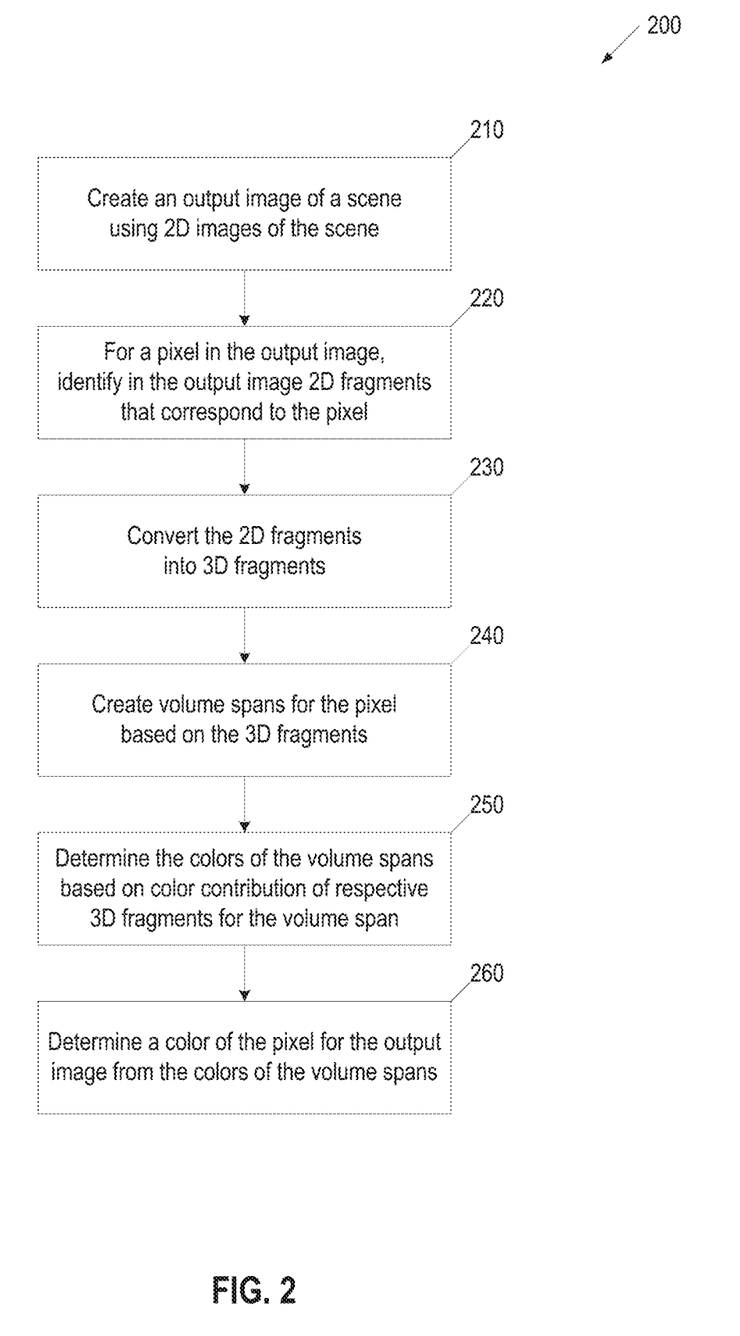
FIG. 2 depicts a flow diagram of aspects of a method for determining a color of a pixel using three-dimensional fragments, in accordance with one implementation of the present disclosure.

FIG. 2 depicts a flow diagram of aspects of a method 200 for determining a color of a pixel using three-dimensional fragments, in accordance with one implementation of the present disclosure. The method 200 is performed by processing logic that may comprise hardware (circuitry, dedicated logic, etc.), software (such as is run on a general purpose computer system or a dedicated machine), or a combination of both. In one implementation, the method is performed by a compositor 125 of FIG. 1, while in some other implementations one or more blocks of FIG. 2 may be performed by another machine.

At block 210, the processing device creates an output image (e.g., output image 130 in FIG. 1) of a scene using one or more two-dimensional (2D) images of the scene. The one or more 2D images can be 2D RGBA images (e.g., RGBA images 185 in FIG. 1) that are generated by one or more cameras (e.g., cameras 105A-P in FIG. 1). The processing device can use computer vision techniques and 3D alignment techniques for aligning the 2D RGBA images produced by the cameras to create the output image.

At block 220, for a pixel in the output image, the processing device identifies, in the output image, 2D fragments that correspond to the pixel. The processing device can identify one to four fragments for a pixel. There may be a significantly large number of points with high resolution textures in the 2D RGBA images. In one implementation, the processing device uses a surface splatting point rendering technique to tolerate inherent loss in geometric accuracy and texture fidelity when processing a large volume of points. In one implementation, the processing device uses surface splatting to generate a splat in an output image, for each pixel, in the 2D RGBA images. A splat is a point in a pixel. The processing device can use a forward splatting algorithm to generate splats. In one implementation, the processing device applies the forward splatting algorithm to a pixel in an input image (e.g., image produced by a camera) and produces one splat in the output image. The processing device can apply the splatting technique to each pixel in the input image to convert each input image pixel into a splat, which lands in a location in an output image. There can be multiple splats that land into each output pixel (i.e., pixel in an output image). The processing device can use the splat for a pixel in an output image to generate fragments for the pixel of the output image.

The processing device can compute the color for each pixel by blending the contributions, for example, of fragments of images that are drawn nearby and weighting the contribution of each fragment in accordance with how much of the pixel is covered by the fragment. This technique is referred to as "anti-aliasing", because it reduces the "aliasing" effect of under-sampling which results in abrupt changes in the images. An example scheme for implementing anti-aliased image generation is the A-buffer scheme. The A-buffer can be used to produce an open-ended list of all the contributions of fragments to a pixel. A list of fragments is maintained for each drawn object that overlaps the pixel. The processing device can apply an A-buffer algorithm to the splat to create fragments for the pixel.

Figure 3:
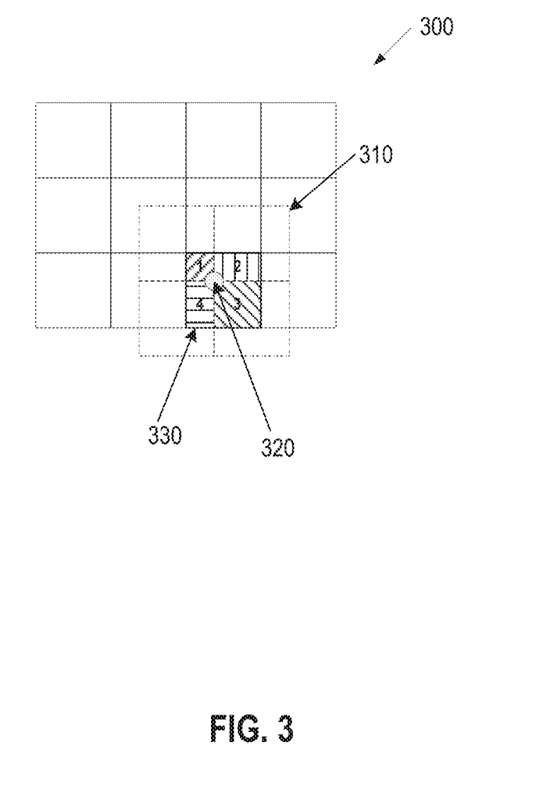
FIG. 3 depicts an example of identifying two dimensional (2D) fragments for a pixel, in accordance with one implementation of the present disclosure.

FIG. 3 depicts an example of identifying 2D fragments for a pixel, in accordance with one implementation of the present disclosure. An output image 300 can include a set of pixels. The pixels can be square. The processing device can generate one or more splats that land in each pixel in the output image. For example, a splat 320 is in pixel 330.

The processing device can apply an A-buffer to the set of pixels in image 300 to produce a set of fragments (e.g., fragments 1-4). A fragment is a polygon clipped to a pixel boundary. For example, pixel 330 has four fragments 1-4, which are each a polygon. The A-buffer can process polygons in scan-line order by clipping them to each square pixel they cover to output a list of fragments corresponding to each square pixel. The A-buffer can slide a grid 310 across the pixels in the image 300 to define the fragments (e.g., fragments 1-4) for a pixel (e.g., pixel 330) in reference to a splat (e.g. splat 320) for the pixel. The processing device can generate and store color data (e.g., RGBA vector) for each fragment.

Referring back to FIG. 2, at block 230, the processing device converts the 2D fragments into three-dimensional (3D) fragments. A 2D fragment has an x-y footprint using an x-axis and a y-axis. For each 2D fragment, the processing device adds a pre-defined thickness to a front side and a back side of the 2D fragment along an axis of a third dimension. The third dimension can be in a disparity ("d") space or a depth ("z") space. Disparity d is the flow vector length in place of depth, and is inversely proportional to depth z, such that disparity $d=1/z$. Disparity d is used as an example of a third dimension throughout this document.

Figure 4:
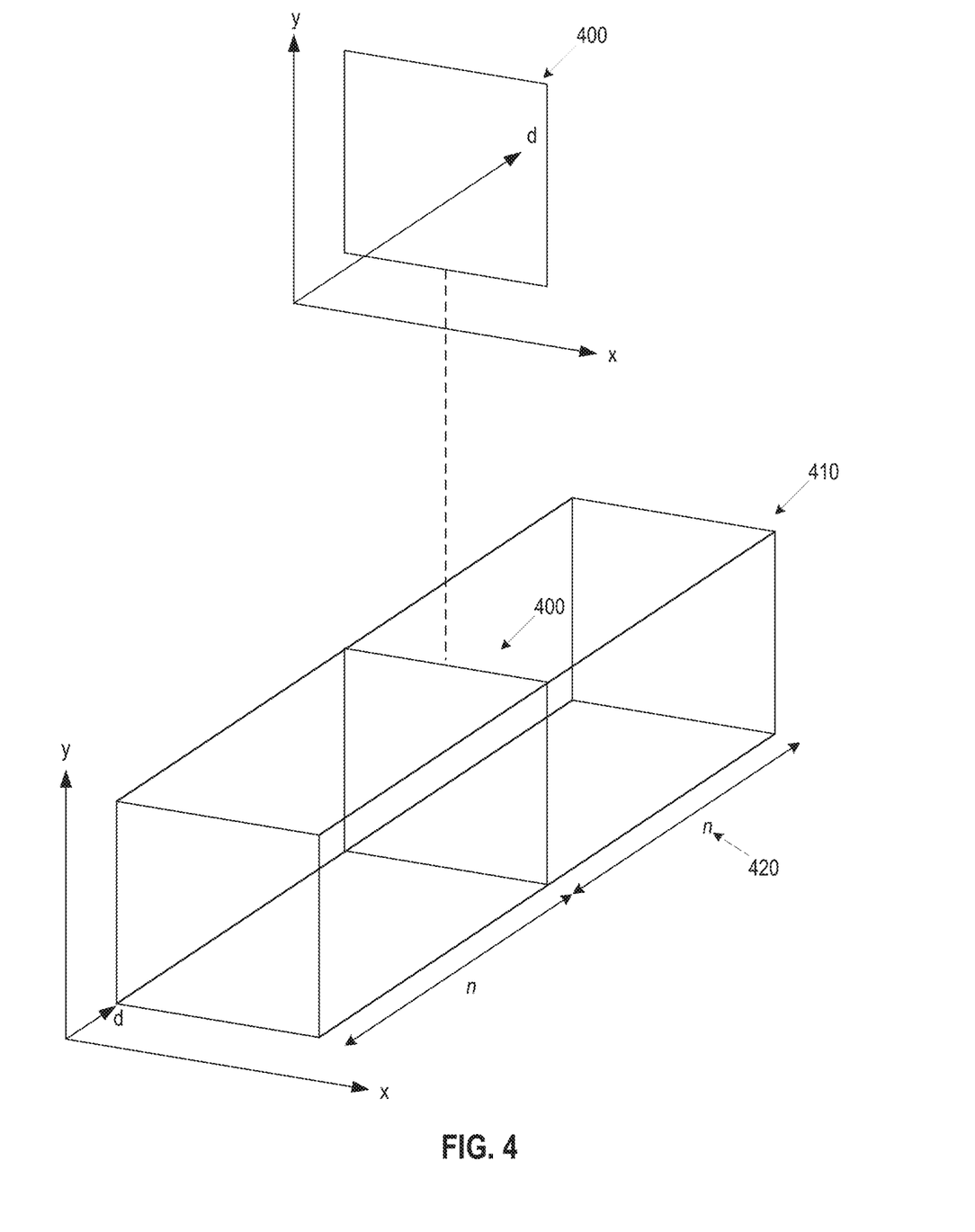
FIG. 4 depicts an example of converting a 2D fragment into a three dimensional (3D) fragment, in accordance with one implementation of the present disclosure.

FIG. 4 depicts an example of converting a 2D fragment into a 3D fragment, in accordance with one implementation of the present disclosure. The processing device identifies one or more 2D fragments for the pixel. For simplicity of explanation, one 2D fragment 400 for the pixel is depicted in FIG. 4. The processing device adds the pre-defined thickness ("n") 420 to a front side of the 2D fragment 400 and to the back side of the back side of the 2D fragment 400 along a d-axis (e.g., disparity axis) to convert the 2D fragment 400 into a 3D fragment 410. In another implementation, the pre-defined thickness can be defined in a depth space along a z-axis (e.g., depth axis). The pre-defined thickness n 420 can be configurable and/or user-defined.

Referring to FIG. 2, at block 240, the processing device creates volume spans for the pixel based on the 3D fragments. The processing device can order the 3D fragments along a third dimensional axis (e.g., d-axis). The processing device can position the 3D fragments along the d-axis according to the disparity of the 3D fragments.

Figure 5:
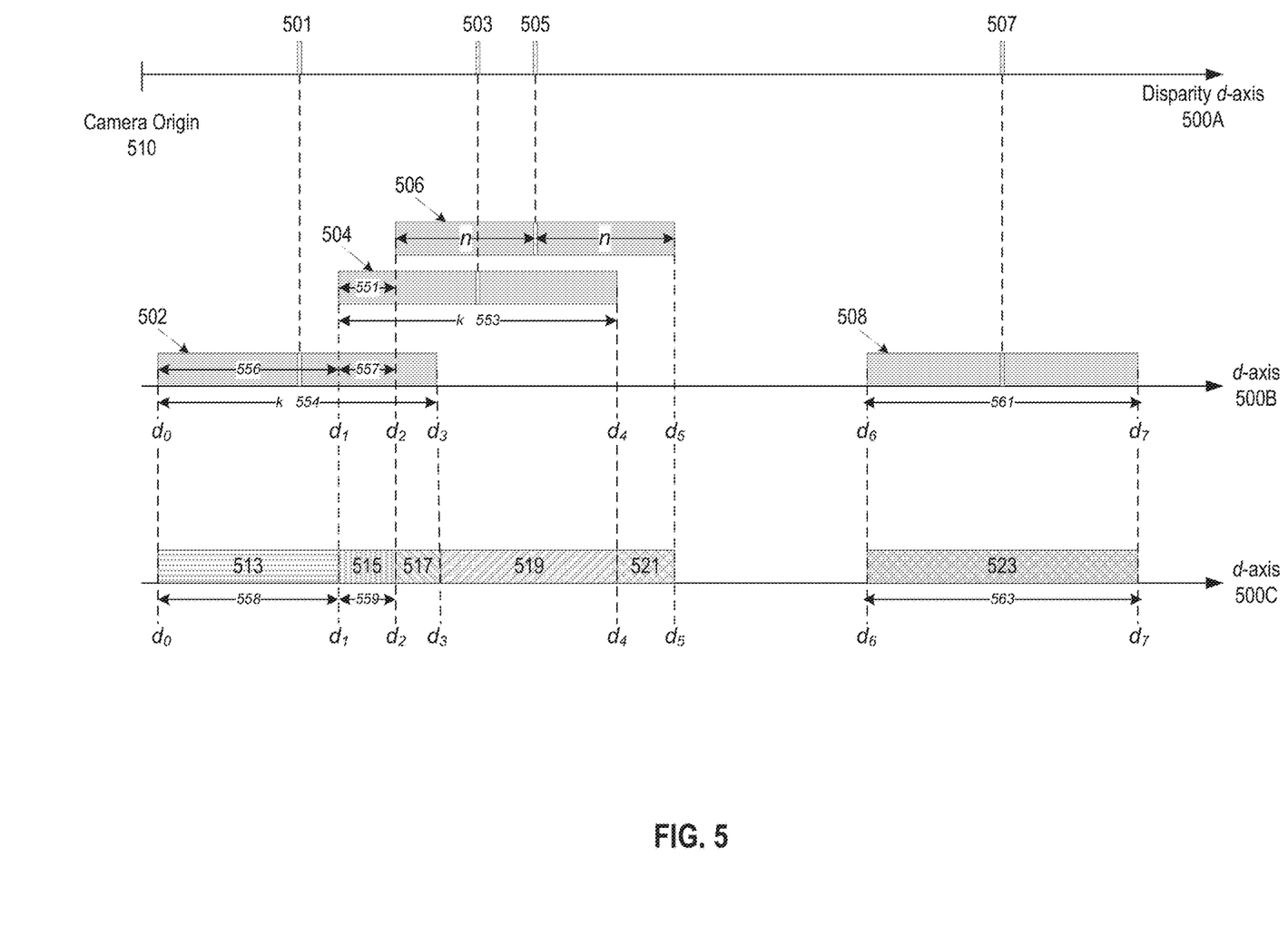
FIG. 5 depicts an example of creating volume spans for a pixel, in accordance with one implementation of the present disclosure.

FIG. 5 depicts an example of creating volume spans for a pixel, in accordance with one implementation of the present disclosure. In the example in FIG. 5, the d-axis 500A-C represents disparity relative to a camera origin 510. There are four 2D fragments (e.g., fragments 501,503,505,507) for the pixel. The d-axis 500A represents a third dimension in a disparity space. Disparity is inversely proportional to depth, and can be relative to a camera's original 510. The d-axes 500A-500C represent disparity $d=1/z$ and can have a reference point representing the camera origin 510. The d-axis 500A illustrates a cross-sectional view of four 2D fragments 501,503,505,507, each having an x-y along an x-axis (e.g., x-axis in FIG. 4) and a y-axis (e.g., y-axis in FIG. 4). For simplicity of explanation, the x-axis and y-axis are not depicted in FIG. 5.

The d-axis 500B illustrates a cross-sectional view of four 3D fragments 502,504,506,508. The processing device can add a pre-defined finite thickness n to both sides of each of the 2D fragments 501,503,505,507 in d-axis 500A to convert the 2D fragments 501,503,505,507 into the 3D fragments 502,504,506,508 shown in d-axis 500B.

The processing device can identify and mark a start event and an end event for each of the 3D fragments 502,504,506, 508 in d-axis 500B. A start event is a start of a 3D fragment and can be represented by the metric (e.g., disparity) of the d-axis 500B. An end event is an end of the 3D fragment and can be represented by the metric (e.g., disparity) of the d-axis 500B. For example, the processing device marks a start event $d_0$ and an end event $d_3$ for 3D fragment 502, a start event $d_1$ and an end event $d_3$ for 3D fragment 504, a start event $d_2$ and an end event $d_5$ for 3D fragment 506, and a start event $d_6$ and an end event $d_7$ for 3D fragment 508. The event markings can be stored in a data store (e.g., data store 180 in FIG. 1).

The processing device can create volume spans for the pixel based on the start events and end events of the 3D fragments 502,504,506,508. The processing device can define volume spans by, for example, ordering the event markings sequentially based on the values for disparity d for the events. The processing device can use the order of event markings to define start events and end events for volume spans for the pixel. A volume span is a 3D fragment for which one of the event markings (e.g., $d_v$) is selected as its start event, and the next event marking (e.g., $d_{v+1}$), in the sequential order of event markings is selected as its end event. For example, the processing device can create a volume span 513 by defining the volume span 513 as having a start event of $d_0$ and an end event as $d_1$. In another example, the processing device can create another volume span 515 by defining the volume span 515 as having a start event of $d_1$ and an end event as $d_2$. In other examples, the processing device can use the event markings $d_0$, $d_1$, $d_2$, $d_3$, $d_4$, $d_5$, $d_6$, and $d_7$ to define and create volume spans 513-523 for the pixel.

Referring to FIG. 2, at block 250, the processing device determines the colors of the volume spans (e.g., volume spans 513-523 in FIG. 5) based on color contribution of respective 3D fragments that make up the volume span. To determine the color contribution, the processing device identifies which 3D fragments have a portion that overlaps the volume span, and thus contribute color to the volume span. For example, in FIG. 5, for volume span 513, 3D fragment 502 has a portion 556 that overlaps volume span 513. The color of portion 556 contributes to the color of the volume span 513. In another example, for volume span 515, the processing device may determine that 3D fragment 502 has a portion 557 that overlaps volume span 515, and that 3D fragment 504 has a portion 551 that overlaps volume span 515. The color of portion 557 and the color of portion 551 contribute to the color of the volume span 515.

The processing device can determine a color contribution for the identified 3D fragments. The color contribution of the 3D fragments for a particular volume span can be determined as the length of the volume span divided by the total thickness k of the 3D fragments. The total thickness k is the same for the individual 3D fragments. The processing device can determine the color contribution of the identified 3D fragments as:

$$(d_{i+1}-d_i)/k \quad \text{(Equation 1)}$$

In Equation 1, parameter i refers to the volume span. The length of the volume span is $(d_{i+1}-d_i)$. Parameter k refers to the total thickness of the 3D fragment. The color contribution can be presented as a value or a percentage. For example, for volume span 523, a single 3D fragment (e.g., 3D fragment 508) has at least a portion that overlaps the volume span 523. In this case, the entirety of 3D fragment 508 overlaps the volume span 523. The length 563 of the volume span 523 divided by the total thickness 561 of 3D fragment 508 may be 1 or 100%. The contribution of the 3D fragment 508 to the color of the volume span 523 is 100%.

In another example, for volume span 513, a single 3D fragment (e.g., 3D fragment 502) has at least a portion that overlaps the volume span 513. In this case, the length 558 of the volume span 513 divided by the total thickness 554 of 3D fragment 502 may be 0.6 or 60%. The contribution of the 3D fragment 502 to color of the volume span 513 is 60%.

In another example, for volume span 515, two 3D fragments (e.g., 3D fragment 502, 3D fragment 504) have at least a portion that overlaps the volume span 515. In this case, the length 559 of the volume span 515 divided by the total thickness (e.g., total thickness 553 or total thickness 554, which are the same) of the 3D fragments (e.g., 3D fragment 502, 3D fragment 504) may be 0.2 or 20%. The contribution of the 3D fragments (e.g., 3D fragment 502, 3D fragment 504) to the color of the volume span 515 is 20%.

The processing device can determine the color of the volume span from the color contributions for the identified 3D fragments that have portions that overlap the volume span. The processing device can determine the colors of the identified 3D fragments, and determine the sum of the colors. The processing device can multiply the sum of the colors of the identified 3D fragments with the contribution of the identified 3D fragments. For example, the contribution of the 3D fragments (e.g., 3D fragment 502, 3D fragment 504) to the color of the volume span 515 is 20%. The processing device can multiply the sum of the colors of the identified 3D fragments by 20%, as described in detail below in conjunction with Equation 2.

The processing device can use the contribution (e.g., $[(d_{i+1}-d_i)/k]$) to determine the color (c') of a volume span (e.g., volume span 515) as:

$$c'_i = [(d_{i+1}-d_i)/k]\Sigma_{j \in \theta_i} Mf_j \quad \text{(Equation 2)}$$

In Equation 2, parameter i refers to the volume span (e.g., volume span 515). Parameter j refers to a 3D fragment (e.g., 3D fragment 504, 3D fragment 502) that includes a portion (e.g., portion 551, portion 557) that overlaps volume span i (e.g., volume span 515). Parameter k refers to the total thickness (e.g., total thickness 553, total thickness 554) of 3D fragment j (e.g., 3D fragment 504, 3D fragment 502). $\theta_i$ refers to the group of portions (e.g., portion 551, portion 557) that overlap with volume span i.

In Equation 2, $f_j$ refers to the RGBA color of the 3D fragment j. A color can be represented by an RGBA color value. An RGBA color value can be specified as three color channels, such as, RGB(Red, Green, Blue), along with opacity information, which is represented by an alpha channel (Alpha). Opacity is the condition of lacking transparency or translucence (opaqueness). The alpha channel specifies the opacity of the object being represented by the 3D fragment j.

An RGBA color value can be specified as a vector, such as RGBA(red, green, blue, alpha). Each color parameter (e.g., red, green, and blue) in the color channels of the vector defines the intensity of the color and can be an integer between 0 and 255 or a percentage value (from 0% to 100%). For example, for a RGB color value, the RGB(0,0, 255) value or RGB(0%,0%,100%) can be rendered as blue, because the blue parameter is set to its highest value (255 or 100%), and the other parameters values are set to 0 or 0%.

The alpha parameter, represented as A or α, in the alpha channel in the vector can be a number, for example, between 0.0 (fully transparent) and 1.0 (fully opaque). In another example, the alpha parameter, represented as A or α, can be represented using an 8-bit color scheme where 255 is fully opaque and 0 is fully transparent. The processing device can determine the RGBA color value of the 3D fragment j from output data (e.g., color data) that is produced by a camera (e.g., cameras 105A-P in FIG. 1). The processing device can access the color data from a data store (e.g., data store 180 in FIG. 1).

The quadruple (R,G,B,A) for a pixel can express that the pixel is covered by a full colored object by a percentage. For example, the RGBA vector (0.5,0,0,0.5) indicates that a full red object half covers the pixel. The quadruple (R,G,B,A) indicates that the pixel is A covered by the color (R/A,G/A,B/A).

In Equation 2 above, M is a weight multiplier that can be configurable and/or user-defined. In one implementation, M is set to 0.5. $Mf_j$ refers to the weighted RGBA color of the 3D fragment j. In one implementation, M is applied only to the A-channel in a RGBA vector to determine the alpha value.

The processing device can use Equation 2 to determine a color (c') of a volume span. The color (c') of the volume span can be represented by a RGBA vector. In one implementation, if the resulting alpha value for the volume span in the RGBA vector exceeds the value of 1, or 255 in an 8-bit color scheme, the processing device can normalize the RGBA vector of the volume span.

The processing device can examine the value of the alpha α in the A-channel in the RGBA color $c'_i$ vector for the volume span and determine whether the α value exceeds 1, or 255 in an 8-bit color scheme. If the α value exceeds the threshold value, then the processing device can normalize the α value by dividing all of the channels in the RGBA vector for the volume span by the α value.

Referring to FIG. 2, at block 260, the processing device determines a color of the pixel for the output image from the colors of the volume spans. The processing device can apply Equation 2 to each volume span. For example, in FIG. 5, the processing device can determine the color ($c_0$) for volume span 513, the color ($c_1$) for volume span 515, the color (c2) for volume span 517, the color ($c_3$) for volume span 519, the color ($c_4$) for volume span 521, and the color ($c_5$) for volume span 523.

The processing device can determine a composite color for the pixel by performing an over operation on the colors of the volume spans as follows:

$$c_{composite} = c_0 \text{ over } c_1 \text{ over } \ldots c_n \qquad \text{(Equation 3)}$$

An over operation is defined as follows:

$$a \text{ over } b = a + (1 - a\_alpha) * b \qquad \text{(Equation 4)}$$

Where a and b are rgba-vectors, and a_alpha is the fourth component of a, i.e. the alpha value. The processing device can store the color of the pixel for the output image (e.g., output image 130 in FIG. 1) in a data store (e.g., data store 180 in FIG. 1). The processing device can repeat blocks 220 through 260 for other pixels in the output image (e.g., output image 130 in FIG. 1). The pixel colors determined by the processing device are more accurate than traditional compositing solutions, and help prevent sudden pixel color changes in the images that are used to create an output video stream (e.g., output video stream 170 in FIG. 1). The pixel colors determined by the processing device provide spatially and temporally continuous compositing to reduce spatial artifacts in 2D images and video flickering in the output video stream.

Figure 6:
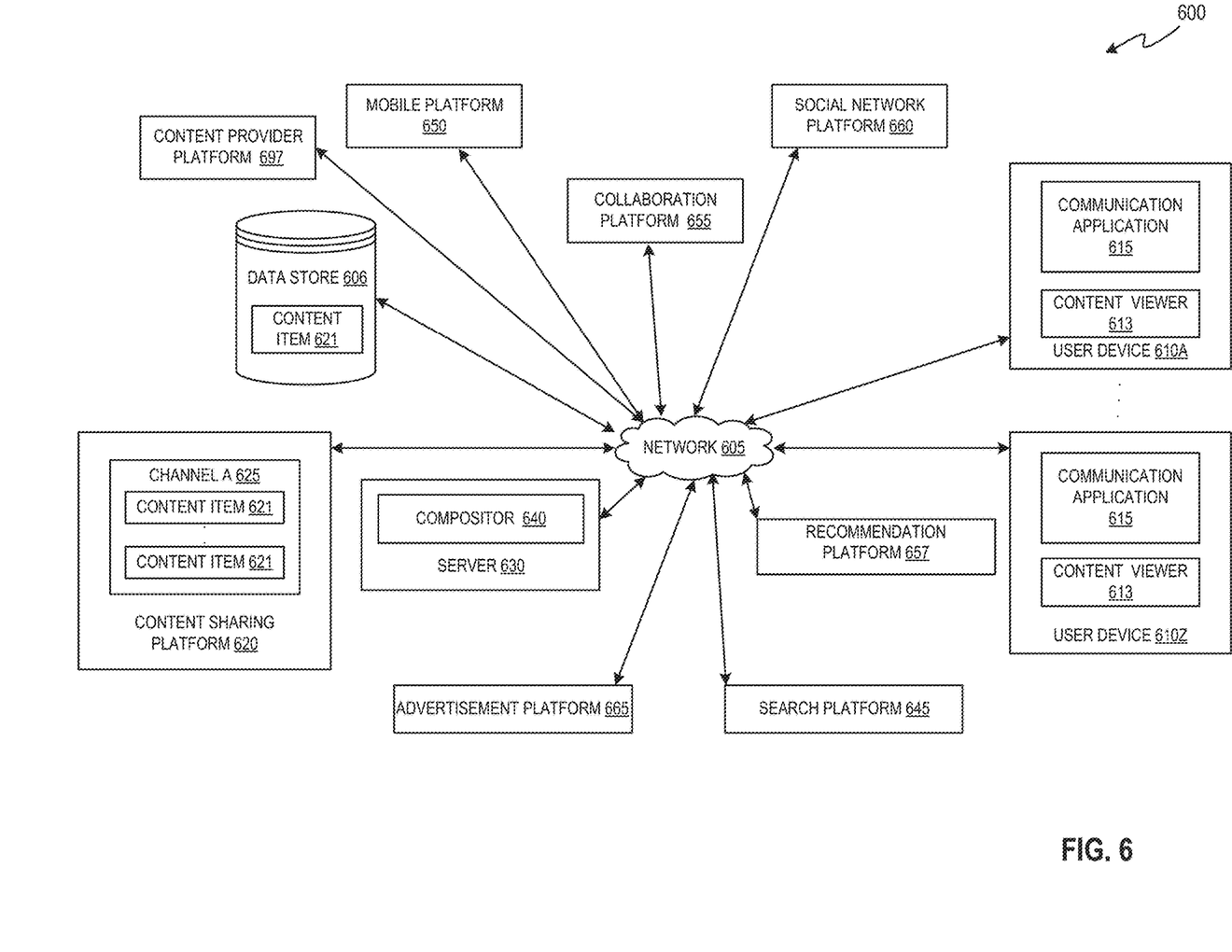
FIG. 6 illustrates an example of system architecture for improved pixel color for spatially and temporally continuous image compositing, in accordance with one implementation of the disclosure.

FIG. 6 illustrates an example of system architecture 600 for improved pixel color for spatially and temporally continuous image compositing, in accordance with one implementation of the disclosure. The system architecture 600 includes user devices 610A through 610Z, one or more networks 605, one or more data stores 606, one or more servers 630, and one or more platforms (e.g., content sharing platform 620, recommendation platform 657, advertisement platform 665, mobile platform 650, social network platform 660, search platform 645, content provider platform 697, and collaboration platform 655). The user devices 610A through 610Z can be client devices.

The one or more networks 605 can include one or more public networks (e.g., the Internet), one or more private networks (e.g., a local area network (LAN) or one or more wide area networks (WAN)), one or more wired networks (e.g., Ethernet network), one or more wireless networks (e.g., an 802.11 network or a Wi-Fi network), one or more cellular networks (e.g., a Long Term Evolution (LTE) network), routers, hubs, switches, server computers, and/or a combination thereof. In one implementation, some components of architecture 600 are not directly connected to each other. In one implementation, architecture 600 includes separate networks 605.

The one or more data stores 606 can be memory (e.g., random access memory), cache, drives (e.g., hard drive), flash drives, database systems, or another type of component or device capable of storing data. The one or more data stores 606 can include multiple storage components (e.g., multiple drives or multiple databases) that may also span multiple computing devices (e.g., multiple server computers). The data stores 606 can be persistent storage that are capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Content items 621 can be stored in one or more data stores 606. The data stores 606 can be part of one or more platforms. Examples of a content item 621 can include, and are not limited to, output video streams (e.g., output video stream 170 in FIG. 1), digital video, digital movies, animated images, digital photos, digital music, digital audio, website content, social media updates, electronic books (ebooks), electronic magazines, digital newspapers, digital audio books, electronic journals, web blogs, real simple syndication (RSS) feeds, electronic comic books, software applications, etc. Content item 621 is also referred to as a media item. For brevity and simplicity, an output video stream (also hereinafter referred to as a video) (e.g., output video stream 170 in FIG. 1) is used as an example of a content item 621 throughout this document.

The content items 621 can be provided by server 630 for storage in one or more data stores 606. The contents items 621 can be immersive videos, also known as "360 videos", "360 degree videos", or "spherical videos", are video streams of a real-world panorama, where the view in every direction is recorded at the same time. During playback, a user can control the viewing direction. The server 230 can include a compositor 240 for providing output video streams (e.g., immersive videos) to users via communication applications 215. The server 230 can be one or more computing devices (e.g., a rackmount server, a server computer, etc.). In one implementation, the server 230 is included in one or more of the platforms. In another implementation, the server 230 is separate from the platforms, but may communicate (e.g., exchange data) with the one or more platforms.

The content items 621 can be provided by content providers for storage in one or more data stores 606. In one implementation, a content provider provides RGBA images (e.g., RGBA image 185 in FIG. 1) to a server 630 (e.g., server 120 in FIG. 1), and the server 640 processes the RGBA images to produce output images (e.g., output image 130) and uses the output images to to create the content item 621 (e.g., output video stream 170 in FIG. 1). A content provider can be a user, a company, an organization, etc.

A service provider (e.g., content sharing platform 620, recommendation platform 657, advertisement platform 665, mobile platform 650, social network platform 660, search platform 645, content provider platform 697, or collaboration platform 655) can provide the immersive videos on user devices 610A-610Z to be viewed by users.

The user devices 610A-610Z can include devices, such as virtual reality headsets. smart phones, cellular telephones, personal digital assistants (PDAs), portable media players, netbooks, laptop computers, electronic book readers, tablet computers, desktop computers, set-top boxes, gaming consoles, televisions, or any type of device supporting 360 view.

The individual user devices 610A-610Z can include a communication application 615. A content item 621 can be consumed via a communication application 615, the Internet, etc. As used herein, "media," "media item," "online media item," "digital media," "digital media item," "content," and "content item" can include an electronic file that can be executed or loaded using software, firmware or hardware configured to present a content item. In one implementation, the communication applications 615 may be applications that allow users to compose, send, and receive content items 621 (e.g., immersive videos) over a platform (e.g., content sharing platform 620, recommendation platform 657, advertisement platform 665, mobile platform 650, social network platform 660, search platform 645, collaboration platform 655, and content provider platform 697) and/or a combination of platforms and/or networks.

For example, the communication application 615 may be a social networking application, video sharing application, photo sharing application, chat application, mobile application of a content provider or any combination of such applications. The communication application 615 in a user device can render, display, and/or present one or more content items 621 (e.g., immersive videos) to one or more users. For example, the communication application 615 can provide one or more user interfaces (e.g., graphical user interfaces) to be rendered in a display of a user device for sending, receiving and/or playing immersive videos.

In one implementation, the individual user devices 610A-610Z includes a content viewer 613 (e.g., media player) to render, display, and/or present content items 621 (e.g., immersive videos) to one or more users. In one implementation, a content viewer 613 is embedded in an application (e.g., communication application 615). For example, for mobile devices, the communication application 615 can be a mobile application that can be downloaded from a platform (e.g., content sharing platform 620, social network platform 660, content provider platform 697, etc.) and can include a content viewer 613 (e.g., media player). In another example, the communication application 615 can be a desktop application, such as a web browser that can access, retrieve, present, and/or navigate content (e.g., web pages such as Hyper Text Markup Language (HTML) pages, digital media items, etc.) served by a web server of a platform. The content viewer 613 can be a web browser plugin or a separate application. In one implementation, the content viewer 613 is embedded in a web page. For example, the content viewer 613 may be an embedded media player (e.g., a Flash® player or an HTML5 player) that is embedded in a document (e.g., a web page).

The content provider platform 697 can provide a service and the content provider can be the service provider. For example, a content provider may be a streaming service provider that provides a media streaming service via a communication application 615 for users to play TV shows, clips, and movies, on user devices 610A-210Z via the content provider platform 697. The content provider platform 697 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide content to users.

The social network platform 660 can provide an online social networking service. The social network platform 660 can provide a communication application 615 for users to create profiles and perform activity with their profile. Activity can include updating a profiling, exchanging messages with other users, posting status updates, photos, videos, etc. to share with other users, evaluating (e.g., like, comment, share, recommend) status updates, photos, videos, etc., and receiving notifications of other users activity. The social network platform 660 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide communication between users.

The mobile platform 650 can be and/or include one or more computing devices (e.g., servers), data stores, networks (e.g., phone network, cellular network, local area network, the Internet, and/or a combination of networks), software components, and/or hardware components that can be used to allow users to connect to, share information, and/or interact with each other using one or more mobile devices (e.g., phones, tablet computers, laptop computers, wearable computing devices, etc.) and/or any other suitable device. For example, the mobile platform 250 may enable telephony communication, Short Message Service (SMS) messaging, Multimedia Message Service (MMS) messaging, text chat, and/or any other communication between users. The mobile platform 650 can support user communications via video messaging, video chat, and/or videoconferences.

The collaboration platform 655 can enable collaboration services, such as video chat, video messaging, and audio and/or videoconferences (e.g., among the users of devices 610A-610Z) using, for example, streaming video or voice over IP (VoIP) technologies, cellular technologies, LAN and/or WAN technologies, and may be used for personal, entertainment, business, educational or academically oriented interactions. The collaboration platform 655 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide communication between users.

The recommendation platform 657 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to generate and provide content recommendations (e.g., articles, videos, posts, news, games, etc.).

The search platform 645 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to allow users to query the one or more data stores 606 and/or one or more platforms and receive query results.

The advertisement platform 665 can provide video advertisements. The advertisement platform 265 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide the video advertisements. The content items 621 (e.g., immersive videos) can be used as video advertisements.

The content sharing platform 620 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to provide one or more users with access to content items 621 and/or provide the content items 621 to one or more users. For example, the content sharing platform 220 may allow users to consume, upload, download, and/or search for content items 621. In another example, the content sharing platform 620 may allow users to evaluate content items 621, such as approve of ("like"), dislike, recommend, share, rate, and/or comment on content items 621. In another example, the content sharing platform 620 may allow users to edit content items 621. The content sharing platform 620 can also include a website (e.g., one or more webpages) and/or one or more applications (e.g., communication applications 615) that may be used to provide one or more users with access to the content items 621, for example, via user devices 610A-610Z. Content sharing platform 620 can include any type of content delivery network providing access to content items 621. The content sharing platform 620 can include a content feed component 690 to present a content feed 695 that lists feed items, such as content items 621 in the user interface of the communication application 615.

The content sharing platform 620 can include multiple channels (e.g., Channel A 625). A channel can be data content available from a common source or data content having a common topic or theme. The data content can be digital content chosen by a user, digital content made available by a user, digital content uploaded by a user, digital content chosen by a content provider, digital content chosen by a broadcaster, etc. For example, Channel A 625 may include immersive videos Y and Z. A channel can be associated with an owner, who is a user that can perform actions on the channel. The data content can be one or more content items 621.

Different activities can be associated with the channel based on the channel owner's actions, such as the channel owner making digital content available on the channel, the channel owner selecting (e.g., liking) digital content associated with another channel, the channel owner commenting on digital content associated with another channel, etc. Users, other than the owner of the channel, can subscribe to one or more channels in which they are interested. Once a user subscribes to a channel, the user can be presented with information from the channel's activity feed. Although channels are described as one implementation of a content sharing platform, implementations of the disclosure are not limited to content sharing platforms that provide content items 621 via a channel model.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Figure 7:
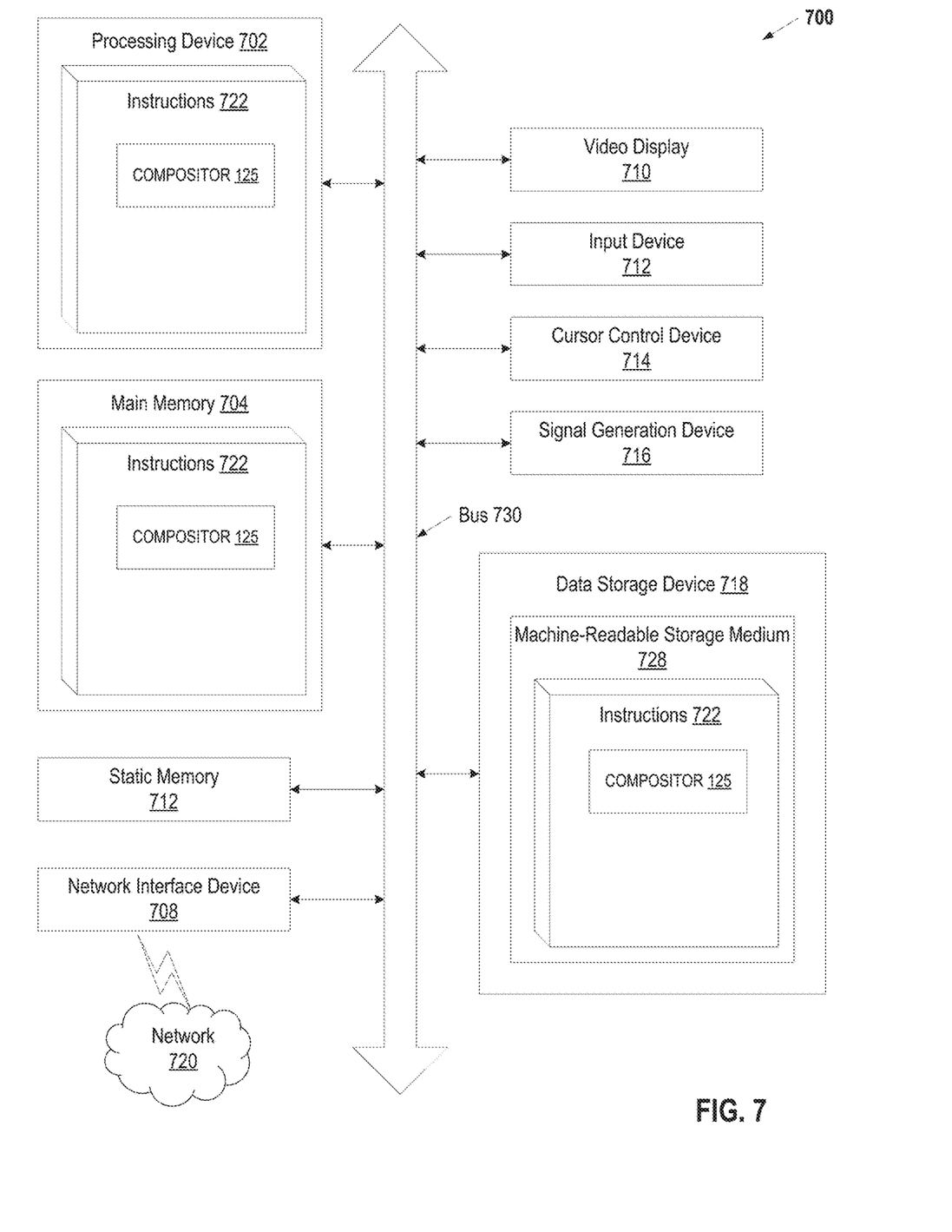
FIG. 7 depicts a block diagram of an example computing device operating in accordance with one or more aspects of the present disclosure.

FIG. 7 illustrates a diagram of a machine in an example form of a computer system 700 within which a set of instructions, for causing the machine to perform any one or more of the methodologies discussed herein, can be executed, in accordance with one implementation of the present disclosure. The computer system 700 can host server 120 in FIG. 1. In alternative implementations, the machine can be connected (e.g., networked) to other machines in a LAN, an intranet, an extranet, or the Internet. The machine can operate in the capacity of a server or a client machine in client-server network environment, or as a peer machine in a peer-to-peer (or distributed) network environment. The machine can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 730.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 722 for performing the operations and steps discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 716 (e.g., a speaker). The computer system 700 also can include a camera 717 to record images that can be stored directly, transmitted to another location, or both. These images can be still photographs or moving images such as videos or movies. The camera 717 can be a depth aware camera that can capture RGB images along with per-pixel depth information.

The data storage device 718 can include a non-transitory computer-readable storage medium 728 on which is stored one or more sets of instructions 722 (e.g., software) embodying any one or more of the methodologies or functions described herein. The instructions 722 can also reside, completely or at least partially, within the main memory 704 and/or within the processor 702 during execution thereof by the computer system 700, the main memory 704 and the processor 702 also constituting computer-readable storage media. The instructions 722 can further be transmitted or received over a network 720 via the network interface device 708.

In one implementation, the instructions 722 include instructions for a compositor (e.g., compositor 125 in FIG. 1) and/or a software library containing methods that call the compositor. While the computer-readable storage medium 728 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "rendering", "determining", "selecting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

What is claimed is:

1. A method comprising:

creating an output image of a scene for an output video stream by aligning a plurality of two-dimensional (2D) images of the scene that are captured by a plurality of cameras;

collecting, based on the plurality of two-dimensional (2D) images of the scene and using surface splatting point rendering, a plurality of 2D fragments for each of a plurality of pixels of the output image for the scene for the output video stream, wherein each 2D fragment contributes a color to a color for the pixel of the output image for the output video stream and is associated with a particular location on an axis of a third dimension;

converting, by a processing device, the plurality of 2D fragments into a plurality of three dimensional (3D) fragments by adding a pre-defined thickness along the axis of the third dimension to each 2D fragment at the particular location on the axis of the third dimension;

creating, by the processing device, a plurality of volume spans for the pixel based on locations of the plurality of 3D fragments along the axis of the third dimension;

determining a color of a volume span of the plurality of volume spans based on a color of one or more of the plurality of 3D fragments corresponding to the volume span; and determining the color of the pixel for the output image for the output video stream from determined colors of the plurality of volume spans.

2. The method of claim 1, wherein the pre-defined thickness is defined in a disparity space.

3. The method of claim 1, wherein determining the color of the volume span comprises:

identifying the one or more of the plurality of 3D fragments that contribute color to the volume span; and determining color contribution of the identified one or more of the plurality of 3D fragments.

4. The method of claim 3, wherein determining the color contribution of the identified one or more of the plurality of 3D fragments comprises:

determining a length of the volume span;

determining a total thickness of individual 3D fragments of the identified one or more of the plurality of 3D fragments; and dividing the length of the volume span by the total thickness.

5. The method of claim 1, wherein creating the plurality of volume spans for the pixel based on locations of the plurality of 3D fragments along the axis of the third dimension comprises:

marking start events and end events for the 3D fragments;

ordering the start events and end events for the 3D fragments sequentially; and defining start events and end events for the plurality of volume spans for the pixel based on a sequential ordering of the start events and end events for the 3D fragments.

6. A system comprising:
a memory; and
a processing device, coupled to the memory, to:

create an output image of a scene for an output video stream by aligning a plurality of two-dimensional (2D) images of the scene that are captured by a plurality of cameras;

collect, based on the plurality of two-dimensional (2D) images of the scene and using surface splatting point rendering, a plurality of 2D fragments for each of a plurality of pixels of the output image for the scene for the output video stream, wherein each 2D fragment contributes a color to a color for the pixel of the output image for the output video stream and is associated with a particular location on an axis of a third dimension;

convert the plurality of 2D fragments into a plurality of three dimensional (3D) fragments by adding a pre-defined thickness along the axis of the third dimension to each 2D fragment at the particular location on the axis of the third dimension;

create a plurality of volume spans for the pixel based on locations of the plurality of 3D fragments along the axis of the third dimension;

determine a color of a volume span of the plurality of volume spans based on a color of one or more of the plurality of 3D fragments corresponding to the volume span; and determine the color of the pixel for the output image for the output video stream from determined colors of the plurality of volume spans.

7. The system of claim 6, wherein the pre-defined thickness is defined in a disparity space.

8. The system of claim 6, wherein to determine the color of the volume span, the processing device is to:

identify the one or more of the plurality of 3D fragments that contribute color to the volume span; and determine color contribution of the identified one or more of the plurality of 3D fragments.

9. The system of claim 6, wherein to create the plurality of volume spans for the pixel based on locations of the plurality of 3D fragments along the axis of the third dimension, the processing device is to:

mark start events and end events for the 3D fragments;

order the start events and end events for the 3D fragments sequentially; and define start events and end events for the plurality of volume spans for the pixel based on a sequential ordering of the start events and end events for the 3D fragments.

10. A non-transitory computer readable medium having instructions stored thereon that, when executed by a processing device of a user device, cause the processing device to perform operations comprising:

creating an output image of a scene for an output video stream using a plurality of two-dimensional (2D) images of the scene that are captured by a plurality of cameras;

collecting, based on the plurality of two-dimensional (2D) images of the scene and using surface splatting point rendering, a plurality of 2D fragments for each of a plurality of pixels of the output image for the scene for the output video stream, wherein each 2D fragment contributes a color to a color for the pixel of the output image for the output video stream and is associated with a particular location on an axis of a third dimension;

converting, by the processing device, the plurality of 2D fragments into a plurality of three dimensional (3D) fragments by adding a pre-defined thickness along the axis of the third dimension to each 2D fragment at the particular location on the axis of the third dimension;

creating, by the processing device, a plurality of volume spans for the pixel based on locations of the plurality of 3D fragments along the axis of the third dimension;

determining a color of a volume span of the plurality of volume spans based on a color of one or more 3D fragments corresponding to the volume span; and determining the color of the pixel for the output image for the output video stream from determined colors of the plurality of volume spans.

11. The non-transitory computer readable medium of claim 10, wherein the pre-defined thickness is defined in a disparity space.

12. The non-transitory computer readable medium of claim 10, wherein determining the color of the volume span comprises:

identifying the one or more of the plurality of 3D fragments that contribute color to the volume span; and determining color contribution of the identified one or more of the plurality of 3D fragments.

13. The non-transitory computer readable medium of claim 12, wherein determining the color contribution of the identified one or more of the plurality of 3D fragments comprises:

determining a length of the volume span;

determining a total thickness of individual 3D fragments of the identified one or more of the plurality of 3D fragments; and dividing the length of the volume span by the total thickness.

14. The non-transitory computer readable medium of claim 10, wherein creating the plurality of volume spans for the pixel based on locations of the plurality of 3D fragments along the axis of the third dimension comprises:

marking start events and end events for the 3D fragments;

ordering the start events and end events for the 3D fragments sequentially; and defining start events and end events for the plurality of volume spans for the pixel based on a sequential ordering of the start events and end events for the 3D fragments.

* * * * *